United States Patent [19]

Virga

[11] Patent Number: 5,398,283
[45] Date of Patent: * Mar. 14, 1995

[54] ENCRYPTION DEVICE

[75] Inventor: Richard Virga, Danbury, Conn.

[73] Assignee: Krypto Fax Partners L. P., Pelham, N.Y.

[*] Notice: The portion of the term of this patent subsequent to Jun. 14, 2011 has been disclaimed.

[21] Appl. No.: 147,221

[22] Filed: Nov. 3, 1993

Related U.S. Application Data

[63] Continuation of Ser. No. 948,055, Sep. 21, 1992, Pat. No. 5,321,749.

[51] Int. Cl.⁶ .......................... H04N 1/44; G09C 5/00
[52] U.S. Cl. .......................... 380/18; 283/73; 380/54
[58] Field of Search ...................... 380/18, 54; 283/73

[56] References Cited

U.S. PATENT DOCUMENTS

| | | | |
|---|---|---|---|
| 2,952,080 | 9/1960 | Avakian et al. . | |
| 3,178,993 | 4/1965 | Ferris et al. . | |
| 3,226,844 | 1/1966 | Howard et al. . | |
| 3,227,474 | 1/1966 | Hoeflinger . | |
| 3,541,960 | 11/1970 | Dilsner et al. . | |
| 3,543,416 | 12/1970 | Pannier . | |
| 3,621,589 | 11/1971 | Jones et al. . | |
| 3,922,074 | 11/1975 | Ikegami et al. . | |
| 4,188,643 | 2/1980 | Schayes et al. . | |
| 4,229,817 | 10/1980 | Morgan et al. . | |
| 4,313,031 | 1/1982 | Widmer . | |
| 4,392,021 | 7/1983 | Slate . | |
| 4,408,093 | 10/1983 | Place . | |
| 4,454,575 | 6/1984 | Bushaw et al. . | |
| 4,603,431 | 7/1986 | Grover et al. . | |
| 4,682,954 | 7/1987 | Cook . | |
| 4,776,013 | 10/1988 | Kafri et al. | 380/54 |
| 4,896,355 | 1/1990 | Iggulden et al. . | |
| 4,901,068 | 2/1990 | Benton et al. . | |
| 4,908,873 | 3/1990 | Phillbert et al. . | |
| 4,912,761 | 3/1990 | Tan et al. . | |
| 4,916,739 | 4/1990 | Iggulden et al. . | |
| 4,922,545 | 5/1990 | Endoh et al. . | |
| 4,949,381 | 8/1990 | Pastor | 380/51 |
| 4,957,689 | 9/1990 | Ohnishi et al. . | |
| 4,972,475 | 11/1990 | Anselmo | 380/54 |
| 4,985,919 | 1/1991 | Naruse et al. . | |
| 4,989,244 | 1/1991 | Naruse et al. . | |
| 4,994,926 | 2/1991 | Gordon et al. . | |
| 5,001,749 | 3/1991 | Iggulden et al. . | |
| 5,001,750 | 3/1991 | Kato et al. . | |
| 5,058,158 | 10/1991 | Matias et al. . | |
| 5,062,136 | 10/1991 | Gattis et al. | 380/18 |
| 5,062,136 | 10/1991 | Gattis et al. . | |
| 5,085,469 | 2/1992 | Castro . | |
| 5,113,445 | 5/1992 | Wang . | |
| 5,159,630 | 10/1992 | Tseng et al. | 380/18 |

OTHER PUBLICATIONS

Knuth, Donald E., *The Art of Computed Programming* 2d Ed., vol. 2, "Seminumerical Algorithms," pp. 29–31.

*Primary Examiner*—Stephen C. Buczinski
*Attorney, Agent, or Firm*—Kenyon & Kenyon

[57] ABSTRACT

A system for the encryption of documents is described. A document, which may contain not only text, but also handwriting, pictures, charts, or other graphic images, is converted into a bitmap. This bitmap is encrypted and printed, preferably in a widely-spaced format for ease of subsequent processing, as an encrypted document. The encrypted document may then be copied or sent via facsimile machine as any other printed document, but without disclosing its contents to individuals other than the intended recipient. The encrypted document, or a replica thereof, is then scanned into a decryption device, which converts it into an encrypted bitmap, decrypts the encrypted bitmap, and displays or prints the decrypted document. Bitmap compression may optionally be used to reduce the size of the encrypted document.

41 Claims, 10 Drawing Sheets

ENCRYPTION DEVICE

This application is a continuation of application Ser. No. 07/948,055, filed on Sep. 21, 1992, now Pat. No. 5,321,749.

BACKGROUND OF THE INVENTION

This invention relates to devices for and a method for encrypting and decrypting documents. More particularly, this invention relates to a device for and a method for the encryption of physical documents of a general type, including, but not limited to, handwritten documents and documents with pictures, so that the encrypted documents can be sent to an intended recipient by any of the various methods normally used for unencrypted documents, including facsimile transmission, avoiding the risk of unintended disclosure to unauthorized persons, while permitting a facsimile of the original document to be reproduced by the intended recipient.

Many encryption and decryption systems are known, including optical devices and methods. In many of these systems, the "key" to the encryption and decryption lies in a screen or lens; to decrypt a document or message encrypted with a particular screen or lens requires the use of the same or a corresponding screen or lens to that used to encrypt the document or message. Other cryptographic systems operate only on textual information and cannot preserve visible, non-textual information present in a document, such as pictures, symbols, type fonts, or handwriting characteristics. Other systems relating to the encryption of television images are known, but they do not lend themselves to the creation of paper documents that can be handled and sent via facsimile transmission.

U.S. Pat. No. 3,922,074 (Ikegami et al.) discloses a method of storing or recording identifying. information on an identifying element and camouflaging the information by recording it through a lenticular plate. The concealed information can then be identified by observing the recording element through the same information medium at the same position used in the initial recording of the identifying information. To decode this information, a person receiving a document must have a lenticular plate corresponding to the one used for encoding the information. U.S. Pat. No. 3,178,993 (Ferris et al.) also describes an optical cryptographic device that uses a lenticular screen.

U.S. Pat. 2,952,080 (Avakian et al.) describes a cryptic grid scrambling and unscrambling method apparatus. In accordance with this invention, certain "bits" or "samples" of the signature are combined and intermixed with non-informational bits, which render the signature unapparent. To decode the information, it is placed under a grid or sectionalizing screen to mask out the non-informational bits. Decoding a document in this fashion requires a particular screen. In encoding the information, certain segments of the document are masked out and thereby lost to permit the mixing of the non-information bits.

U.S. Pat. No. 4,989,244 (Naruse et al.) describes a data encrypting transfer system including a scanner, a data encrypting device for encrypting the image signal, and a data decoder for decoding the encrypted image signal. This system uses a card to key the encryption and decryption device, and describes a card-key protected fax. No intermediate form (i.e., encrypted) document is produced.

It is evident that prior art systems do not address a security problem that is becoming increasingly important with the proliferation of inexpensive telephone facsimile machines and the need for the immediate communication of written information.

Increasingly sensitive information is being sent over fax lines, such as sensitive financial data, international confidential correspondence, personnel information, contracts, and private confidential correspondence. In the past, this information would be sent via First Class Mail or its equivalent. Now, some of this correspondence is sent by overnight express companies. Timeliness and cost are sacrificed when using an overnight express company. There are over one million facsimile ("fax") machines are currently in use in the United States alone. Millions of faxes are sent per business day, and the fax machine is starting to replace mailed letters for brief correspondence. There are currently over 100 different brands and thousands of models of fax devices currently in use.

Documents transmitted by facsimile are often handled by people other than the intended recipient, as, for example, when the recipient is a member of a large organization with a centralized facsimile receiving department or mail room. Unlike ordinary mail, facsimiles are sent and arrive open and in full view of those handling and delivering them. As such, confidentiality of plainly visible information contained therein cannot be guaranteed, particularly when a common fax machine is shared for either (or both) sending or transmitting documents. Although textual information contained in a fax could be encrypted, many important documents contain charts, pictures, handwriting and handwritten notations and the like, which are not suitable for ordinary textual encryption.

Fax machines currently exist that provide a privacy feature. Typically, this feature works as follows:
1. The sender goes to the common fax machine with the confidential document.
2. The sender puts the document in the fax machine, and types a password into the machine as well.
3. The fax machine sends the confidential fax to the receiving machine.
4. The recipient must go to the common fax machine, enter the password, and wait for the confidential fax to print out.

This method of sending a confidential fax suffers from a number of problems. Confidential faxes can only be sent to and from specific models of fax machines from certain manufacturers. They cannot be sent between machines from different companies. The sender and recipient may be forced to go into a public area to send and print the confidential fax, unless an entire (and usually expensive) fax machine is dedicated to this function and placed in a more private area. Since these faxes are sent to and from the memory of the fax machines, they are limited in length by the memory available in the fax machine. The procedures for setting up the machines to send in this mode are complicated; therefore, most organizations do not bother to do so unless the need is extensive. In addition, because machines having privacy features are typically more expensive than standard fax machines, a company may have only a limited number, if any, of such machines.

SUMMARY OF THE INVENTION

It is accordingly an object of this invention to produce encrypted documents that permit the secure transmission and reception of the original document by any facsimile machine, regardless of manufacture, including those built into personal computers and the like.

Another object of the invention is to provide a device that can encrypt and a corresponding device that can decrypt documents containing non-textual information with passwords that can be selected by the users. It is another object of this invention to provide a single device that can both encrypt and decrypt such documents with user-selected passwords.

Yet another object of this invention is to provide a device and system to allow handwriting and image information to be encrypted such that it may be sent via facsimile and decrypted with a corresponding device, and whereby the decrypted document has the same appearance as though the original document had been faxed.

A still further object of this invention is to provide an encrypting device that automatically produces a printed output that can contain unencrypted comments such as page numbers and delivery instructions and a corresponding decrypting device that can automatically decode the encrypted portions of printed output without requiring the physical separation of the unencrypted comments, and produce a printed facsimile of the original document.

These and other objects of the invention will become apparent to those skilled in this art from the following detailed description, when read in conjunction with the drawings.

The present invention provides a system for encrypting and decrypting a document, in which a first unit (the encryption unit) has a first processor and a printer. The first processor encrypts a bitmap representative of the document into an encrypted bitmap, a representation of which is then printed out on a carrier, usually one or more printed pages. A second unit (the decryption unit) is provided which has an optical scanner and a second processor. The carrier containing the encrypted bitmap is scanned by the scanner, and the encrypted bitmap is decrypted by the second processor. Of course, the encryption and decryption unit can be combined into a single unit sharing the same processor, which would then perform both functions.

In a preferred embodiment, the invention provides an encryption device and a decryption device, each having a keyboard for the entry of a encryption keyword, and preferably also a display panel. Each of these devices contains a basic scanning element and a printing element, as does a standard fax machine. (The scanning and printing elements may share some common components, such as the unit described in U.S. Pat. No. 4,957,689, the text of which is incorporated by reference, in which the same driving system moves the scanning unit and transports paper through the printing unit.) Each display panel should be capable of displaying block text and numbers, and each keyboard should have a sufficient number of keys to accept not only alphanumeric instructions from a user, but also alphanumeric password information to be used to encrypt or decrypt a document, depending upon whether it is part of the encryption device or the decryption device. Each device also has a processor for processing bitmaps. The processor preferably comprises a microprocessor with associated random access memory (RAM) and read-only memory (ROM). The processor could alternately comprise a personal computer or other type of computer. Each of the encryption and decryption devices also preferably contains a printer for printing the encrypted or decrypted document, respectively, although other forms of output are possible. Although an encryption and decryption device according to this invention could be packaged in conjunction with a standard fax machine, it is preferred that they be packaged separately from the fax machine, without a telephone handset, telephone line connections, or a dialing pad.

Because the processor may comprise a microprocessor or personal computer, it is preferable that a single processor be able to perform both encryption and decryption functions. In the case of a processor comprising a microprocessor, this can easily be accomplished by storing an appropriate program with both capabilities in ROM. If a personal computer is used as a processor, both (or either) the encryption and decryption functions can be loaded into RAM from a disk. Thus, this invention also provides, in another embodiment, a single encryption/decryption device that comprises an optical scanner for scanning either already-encrypted documents or documents to be encrypted, a display unit suitable for representing alphanumeric information, a keyboard suitable for entering commands and alphanumeric information (including whether to encrypt or decrypt a document to be or being scanned), a processor for both encrypting or decrypting the scanned documents, as appropriate, and a printer to print the result.

DESCRIPTION OF THE PREFERRED EMBODIMENTS

Figure 1:
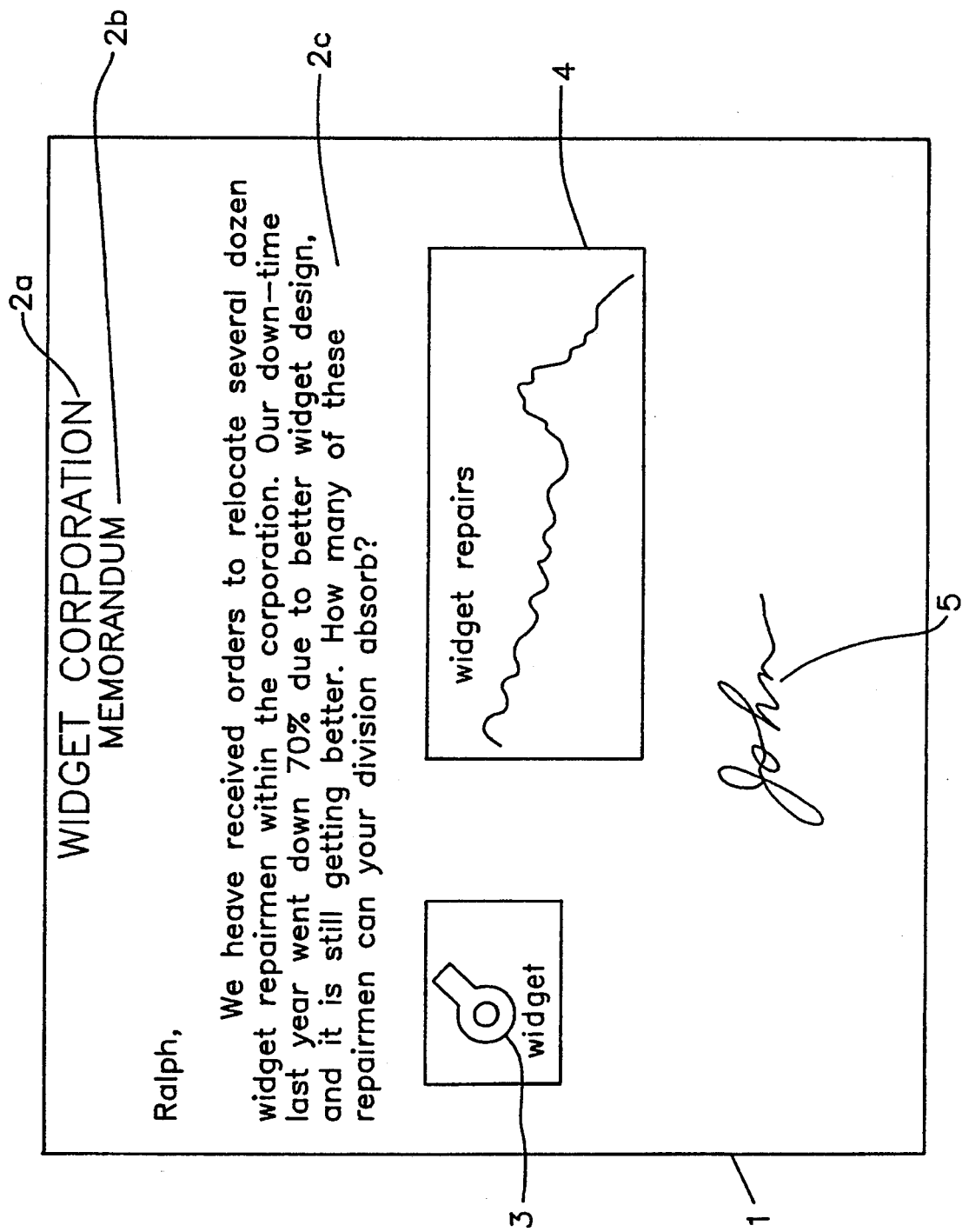
FIG. 1 shows a typical combination document including both textual and non-textual information.

The present invention, in a preferred embodiment, includes an encryption unit similar to a small fax machine with a keyboard and a display panel. The encryption unit incorporates a standard scanning device and printer similar to that of a standard fax machine. In addition, the encryption unit contains a processor capable of transforming arbitrary bitmaps representing compressed graphic information into an encrypted form. The printer prints an encrypted graphical representation of the image on a sheet of paper, or more generally, a carrier. The encrypted representation may also contain textual or graphic information that is not encrypted, which may include, for example, identification of the sender and intended recipient of the encrypted document. Such information may be entered from the keyboard during the encryption process, along with an encryption key. To decrypt a printed document encrypted by this process, it is only necessary to scan the document in a decryption unit, enter the decryption key, and have the decryption unit print out the corresponding unencrypted document. (The terms "key" and "keyword," as used here, are synonomous with "password.")

Since the encrypted documents are provided in printed form, they may be copied in ordinary office copying machines without disclosure of the contents to the person copying, or sent via telephone facsimile machine, for example, to other recipients without the disclosure of the contents to office messengers, secretaries, and the like. In fact, it can be used in much the same manner as any other printed graphical communication, except that only those who have possession of the decryption code can read the encrypted graphical message.

Because it is envisioned that one of the most likely uses for the invention is in the transmission of secure facsimile messages, the encryption and printing of the encrypted document preferably includes a further coding of the resulting pixels representing the encrypted image. If, for example, a random 50% gray bit pattern is added modulo-2 to the image bitmap (i.e., "xor-ed"), the encrypted image can become a random array of tiny black and white pixels without any discernable pattern. This image would be unreadable to a human. However, it may also become difficult to transmit such a pattern via facsimile because of the resolution required and because of noise on the telephone lines and scanning misregistration, especially if the resolution of the encoded pixels exactly matched (or worse, exceeded) that of the facsimile scanner. Finally, the difficulty in decoding the document is unnecessarily increased by using too fine a pattern in the encrypted image. It is necessary to perfectly align (more precisely, align the respective bitmaps with one another) the same gray pattern with the encrypted image to reproduce the decrypted document. This is made difficult if the pattern is too fine, or if it is misaligned or skewed. Coding the pixels into larger multi-pixel symbols representing the encrypted image allows the decryption process to use simple pattern recognition techniques to make it easier to recognize the encrypted portions of the document, separate the encrypted pixels from unencrypted information, and store the encrypted image in memory for decryption. By printing pre-defined marks, for example, at the top and bottom of each encoded, pixel enlarged line, and by choosing specific spacing of pixels, it will be relatively easy to separate textual additions (routing, etc.) from the bitmap. This will also make it relatively easy to verify orientation of the page, to confirm that the scanned page was produced by a companion system, and no recognize each pixel even if some noise has occurred over the telephone line, or if the size or aspect ratio of the page has been altered.

Figure 10:
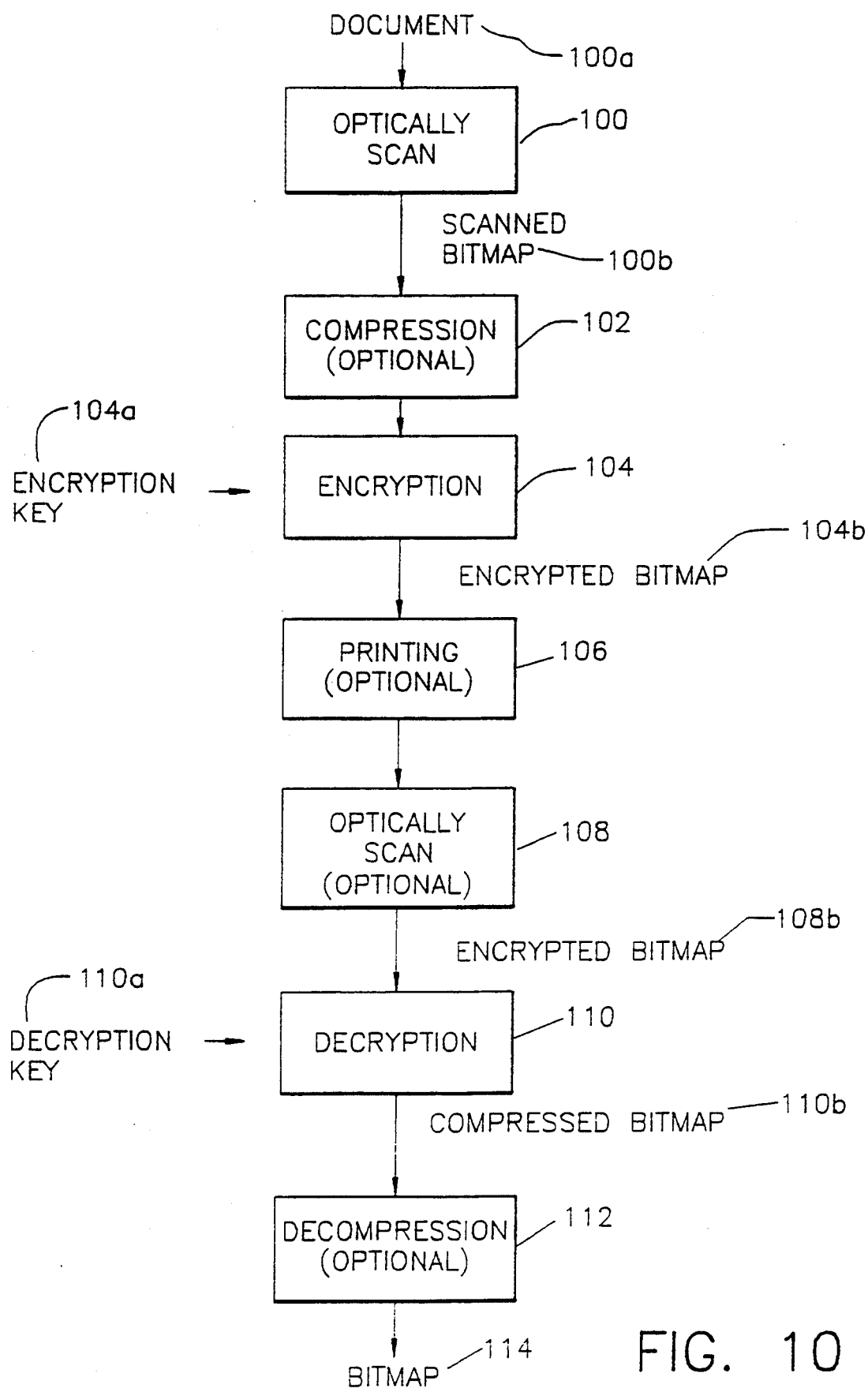
FIG. 10 is a flow chart illustrating the steps of the method of a representative embodiment of the present invention.

Coding the encrypted image pixels into multi-pixel symbols also results in the expansion of an encrypted document. For this reason, it is desirable to use at least one of the various types of compression algorithms on the scanned bitmap (100b of FIG. 10) to reduce the space required for the encrypted document. Compression, as used here, is simply the application of a reversible coding of a type designed to reduce the number of bits necessary to represent a bitmap. Decompression is the application of the reverse coding to recreate the original bitmap.

In normal use, it is expected that the decryption function would be performed some distance from the encryption function, as when an encrypted document is faxed from one location to another. A single device capable of both encryption and decryption could be used to decrypt received faxes and encrypt responses. It may, in some circumstances, be desirable to provide separate devices for the encryption and decryption units. The capability of the machine could be determined, for example, by the content of the ROM in the processor.

Turning now to the illustrations, FIG. 1 represents a typical combination document 1 such as is typical of most business documents. (A "combination document" includes both textual and non-textual information, such as pictures.) This sample shows different sizes of print 2a, 2b, 2c, a picture 3, a chart 4, and a signature 5. Of course, other combinations are possible; indeed, the entire document could be hand-written. Document 1 is not well-suited to standard text encryption methods, since such methods cannot be used to encrypt visual devices such as the picture 3, the chart 4, or the signature 5. Additionally, the presence of non-textual features and different size print make it difficult for OCR (optical character recognition) scanners to process the textual content of the document. However, this type of document may easily be scanned and converted into a bitmap through known methods.

Figure 2:
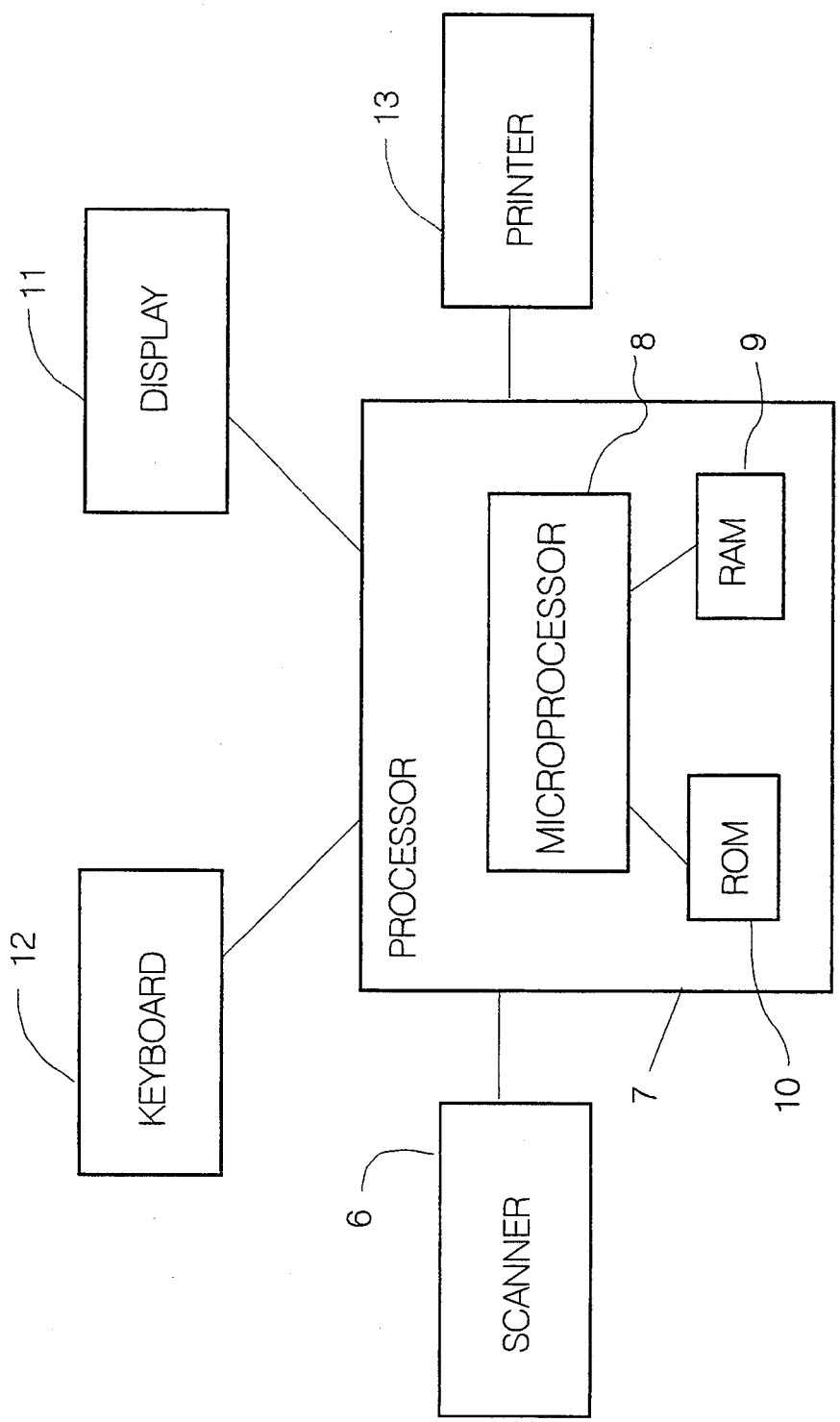
FIG. 2 is a block diagram of a preferred embodiment of the invention, showing a combined encryption/decryption unit.

Turning to FIG. 2, one embodiment of the invention comprising a combined encryption/decryption unit is shown. Scanner 6 is of a conventional type known in the art. This device converts the pattern of light and dark on document 1 into a sequence of bits (i.e., a bitmap) representing light and dark pixels on the document by a scanning process. Typically, the bits would simply represent light pixels as a 0 and dark pixels as a 1, or vice versa. By representing each pixel by more than one bit, however, it is possible to represent various shades of gray in half-tone images or even different colors that may be present in the image, as further explained below. Whatever sequence of bits is generated, it is fed into the processor 7. The processor 7 in this embodiment comprises a microprocessor 8, RAM 9, and ROM 10, wherein ROM 10 controls the operation of microprocessor 8 and includes a program comprising the encryption and decryption algorithms. Display 11 may be an LCD display such as that found on portable personal computers, or it may be a somewhat smaller LCD display, such as the type found on the electronic organizers that are commonplace today. Other types of displays could also be used, although LCD displays are preferred because they are flat and require little power. The processor 7 provides prompting messages through display 11 and controls the operation of the scanner and printer. Responses to these prompts are entered by the user on alphanumeric keyboard 12. A printer 13 is connected to processor 7 to print encrypted or decrypted documents, as appropriate.

The encryption of half-tone images and color images requires a scanner capable of scanning and representing such images. For example, if the original image is an industry-standard 256-level gray scale image, a particular scanned pixel could be represented by a number from 0 to 255, representing the lightness or darkness of the pixel, i.e., the gray level or half-tone code. Thus, instead of a one-bit representation of each pixel, in this representation, each pixel has an eight-bit representation. These bits can be encrypted just as can documents represented by one bit per pixel, except that they appear eight times larger (in the case of a 0 to 255 half-tone code) to the encryption algorithm and require eight times the amount of storage per page of document. A similar process can be used for RGB color scanners, where 8-bit representations of red, green, and blue values would yield full 24-bit color representations of documents. Of course, the documents could be subject to various types of compression, but it is expected that the encrypted documents will be much larger than documents scanned with a one-bit representation per pixel.

Half-tone and color encrypted documents can be printed with an ordinary black-and-white printer, e.g., by printing single bits encoded as black-and-white symbols as described below. A symbol indicating "half-tone" or "color" should proceed each group of symbols representing the encrypted input pixel, and each group of symbols should either be printed twice, or once with a checksum, to ensure correct interpretation of the encrypted codes and to properly synchronize the decryption algorithm to produce the decrypted output pixels. Of course, to properly reproduce encrypted halftone or color images, a half-tone or color printer is required.

Assuming that the user intends to encrypt the document (100a of FIG. 10) being scanned (step 100 of FIG. 10), he or she will enter the response appropriate to the encryption operation. Processor 7 receives this input from keyboard 12 and further processes the bitmap (100b of FIG. 10) received from the scanner in accordance with the instructions received from the user. Additional prompting may be sent to the display 11 to request information to be entered from the keyboard 12. This information may include non-encrypted information to be printed on every page of output, such as the originator and the intended recipient of the message, the date, and the page number. Of course, the processor 7 may generate its own page numbers and a date to be placed on each page of the document. Printing sequential page numbers on each page of the encrypted document is desirable, since, should an encrypted document consist of several pages, there is likely to be no otherwise obvious way of knowing the order in which they should be decrypted should these pages become uncollated. The encrypted bitmap representation (104b of FIG. 10) is then sent to the printer 13 for printing, along with any printed comments entered by the user through the keyboard 12 and any dates or page numbering or other standard markings that may be entered automatically by the processor 7. A dialog typical of one that might take place between a user wishing to encrypt a document and the device is shown in Table I. (Pressing the "enter" key is shown as [enter], and the "end" key as [end].)

TABLE I

| Displayed Prompt | User Response |
| --- | --- |
| Press "E" to Encode or "D" to Decode | E |
| Type "TO" information and press "Enter" | Ralph Jones, Branch Manager [enter] |
| Type the password for this document (4–20 characters) | JOBOFF [enter] |

TABLE I-continued

| Displayed Prompt | User Response |
| --- | --- |
| and press "Enter" | |
| Comments? (e.g., Date, Delivery info, etc.?) Y/N: | Y |
| Type comment info, press "Enter" for more or "End" when done | Ralph, please call me ASAP for [enter] |
| Type comment info, press "Enter" for more or "End" when done | password and other issues [end] |
| Begin Encoding? Y/N: | Y |
| Feed pages for encoding, press "End" when done | (user feeds the pages of the document and presses [end] when done) |

It is possible to store the entire scanned bitmap of a page prior to processing. This requires, for example, for 2-level (black-and-white) processing, 4.7 megabits of RAM memory, assuming the typical facsimile resolution of 200 dots per inch and a maximum page size of 8.5 by 14 inches (8.5×14×200×200=4,760,000 bits). A real time method can and most preferably will be used as scanning is being performed. By applying the criteria for compression (polygons of all black or all white, for instance), a mixture of encoded raw bits from the original and polygon codes can be built up in RAM. After the coded structure of the page is completed, printing is performed.

Figure 3:
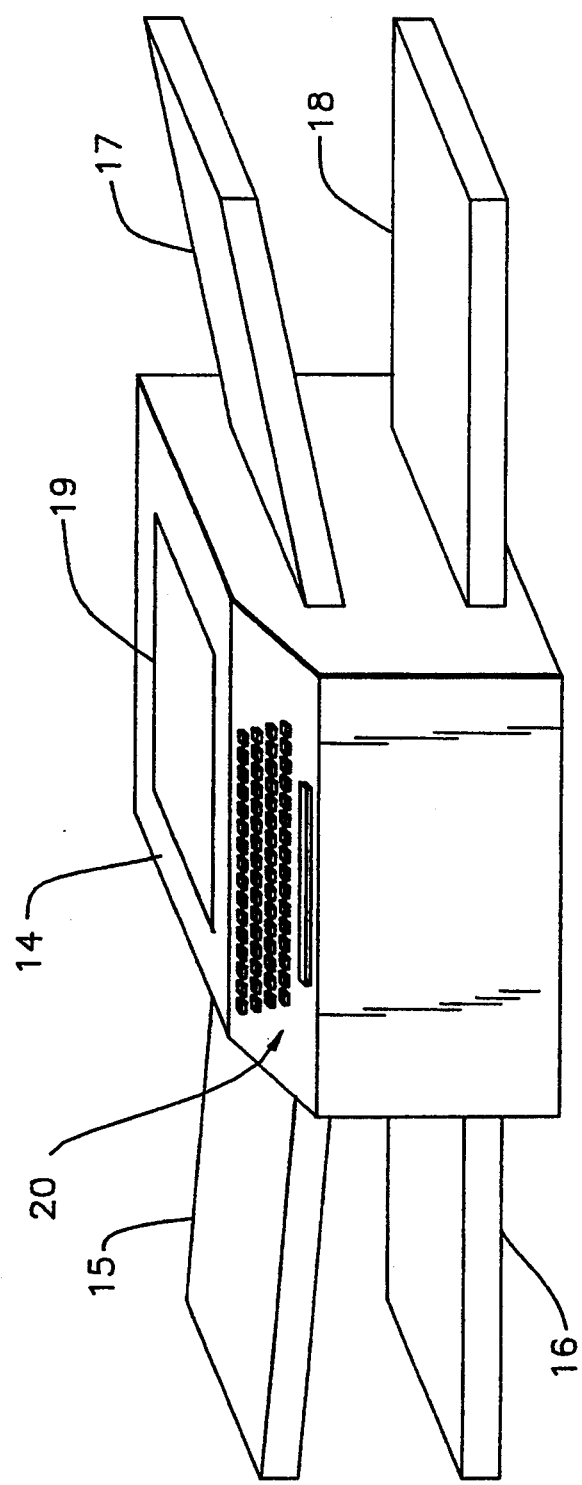
FIG. 3 is a schematic illustration of how the preferred embodiment of the invention would appear to a user.

An illustration of how the encryption/decryption unit may look to the user after it is built is shown in FIG. 3. The encryption/decryption unit is housed in a box 14. Documents to be encrypted or decrypted are placed into a hopper 15 from which they are received and sent one page at a time through the scanner inside the box 14. The printer, which is also inside box 14, receives papers from a cassette 16. After pages received from hopper 15 are scanned, they are placed in a bin 17 from which they may be removed. The printed output of the unit is placed in a tray 18. An LCD display 19 is placed at a position convenient for the operator. Display 19 is preferably a multi-line display, but it need only be able to display sufficient information to prompt the user and to provide feedback to the user for information entered from alphanumeric keyboard 20. Keyboard 20 is the means by which the operator of the device communicates with the processor, which is also housed inside the box 14. External power may be supplied to the encryption/decryption unit, or an internal battery pack may be provided for emergencies or portable operation. No connection with a telephone line is required, because the encryption/decryption engine produces a printed output that may be faxed, photocopied, bent, and folded (even stapled, under certain conditions to be described later in this Application) in the same manner as any other paper document may be.

Figure 4:
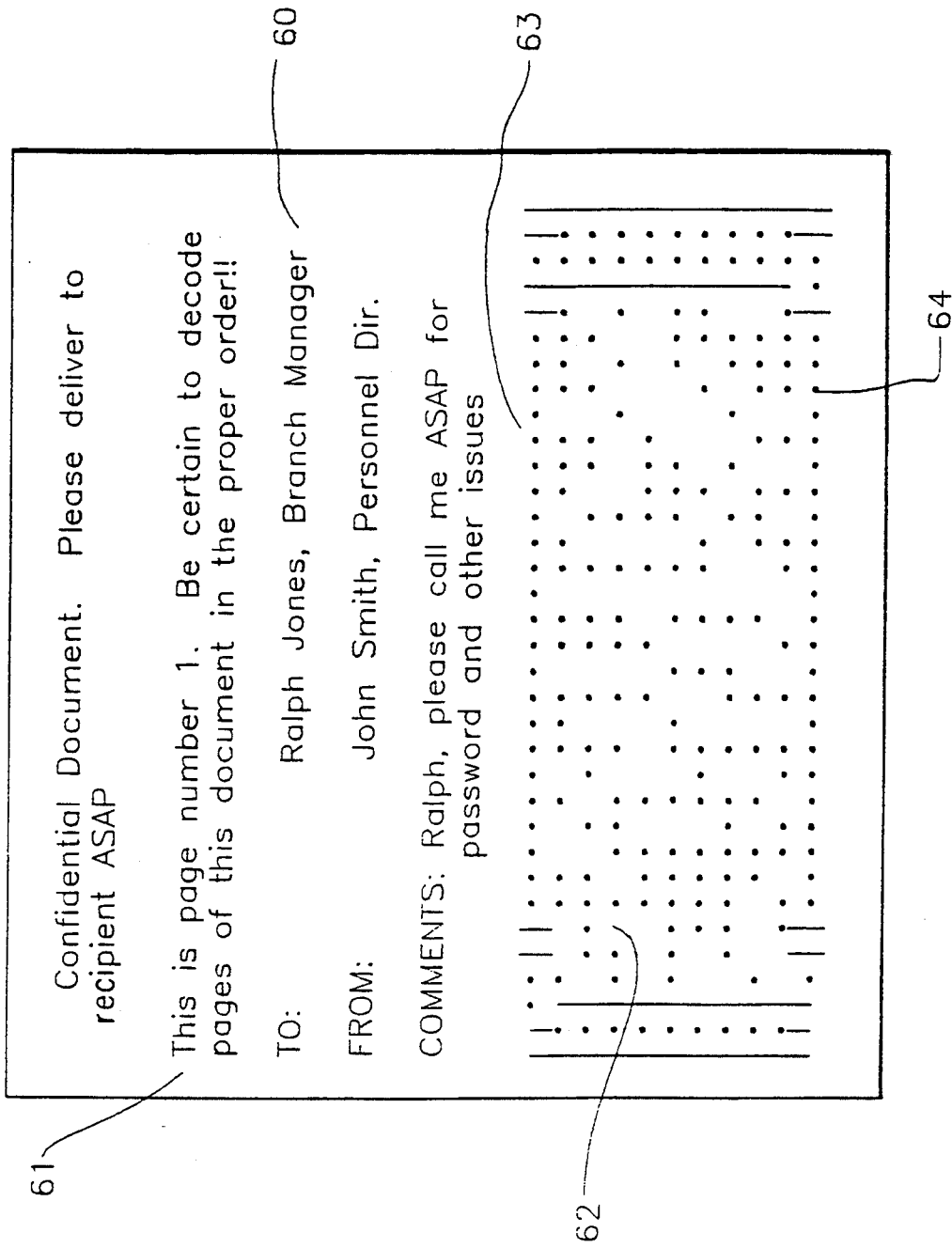
FIG. 4 is a schematic illustration of a typical first page of encrypted output.
Figure 5:
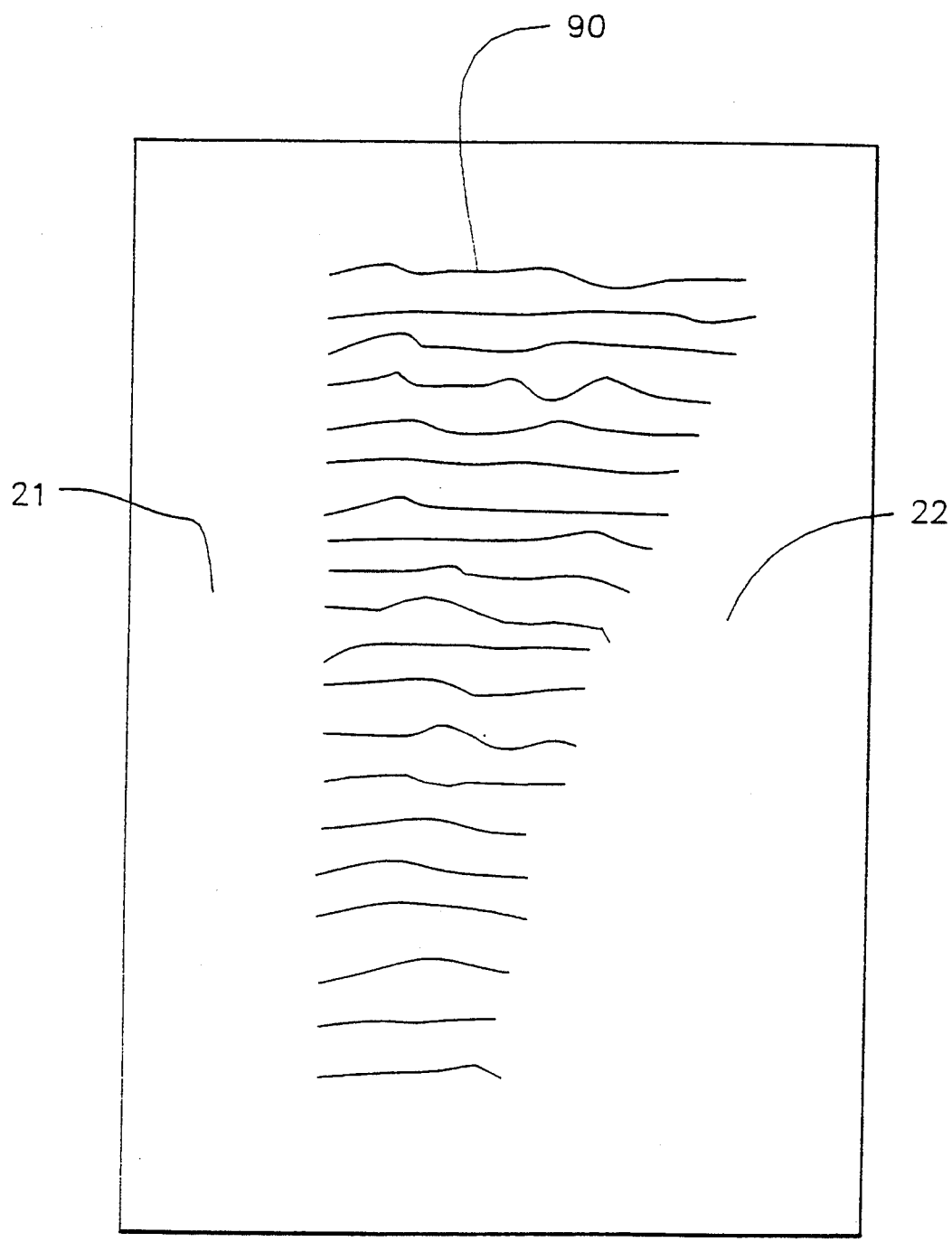
FIG. 5 is an example of a document with polygons that cannot be optimally identified until the entire page is scanned.

As pages are fed for encryption, the encryption/decryption unit prints (step 106 of FIG. 10) one or more pages for each page of the original. An illustration of a typical first page of encrypted output is shown in FIG. 4. The output illustrated here shows automatically generated clear (i.e., unencrypted) text 61 generated for the convenience of the recipient, user-entered clear text 60, and the encrypted portion of the document represented by coded symbols 62. A top-of-page code 63 and a bottom-of-page code 64, each containing an entire line of symbols, is also shown. (The bottom of the last page will have a slightly different code so that the end of the encrypted document may be recognized.) To get the best compression result, the entire page should be scanned and the result held in a buffer in RAM prior to encryption. For example, in FIG. 5, wavy lines 90 are used to schematically represent printing or writing. In FIG. 5, the empty parts of the page 21 and 22 cannot be optimally identified until the whole page is read into the RAM buffer. At that time, however, they could be recognized and coded as unfilled polygons.

The encryption (step 104 of FIG. 10) is performed on each page scanned. When the user is prompted for a password as in Table I, the password is used as a seed for the encryption algorithm. Usually, this means that the password is a seed for a random number generator, although it will be immediately apparent to one skilled in the art that there are numerous encryption algorithms that may be used. It is only necessary that documents encrypted by the encryption algorithm be decrypted by the corresponding decryption algorithm.

For encryption that depends upon a random number generator, decryption is dependent upon the same key (104a of FIG. 10) being used in the identical processor. This method of encryption provides security at least as good as that obtained through the use of first class mail or express courier services. For non-compressed processing using this type of encryption, each scan line is processed one bit at a time. This bit is xor-ed with the next sequential zero or one from the fixed sequence seeded random number generator. The result provides the output bit (zero or one). If more than 20 bits in the scan line or contiguous polygonal area are the same value, it is preferable that binary count or polygon shape and position code be created, including checksum data. The generated count, including the checksum, can then be encrypted and encapsulated with a vertical bar ( ¦ ) enclosing it, and printed on the output page. This is a simple but effective method for compressing contiguous binary data such as the bitmap of a scanned document.

Since 1976, when the Public Key approach to encryption was proposed, exact methods of encryption and their relative effectiveness have been hotly debated. This invention does not require the use of any particular encryption system, although the random number sequence described above is believed to be more than adequate for normal use. Other methods of encryption could be substituted, with greater or lesser security resulting; the encryption 104a and decryption 110a keys may be but need not be the same, depending upon the method of encryption used. Also, other suitable compression methods could be used, such methods being well-known to those skilled in the art. Nevertheless, the invention does not depend upon the use of compression or the use of any particular encryption and decryption algorithms.

Figure 6:
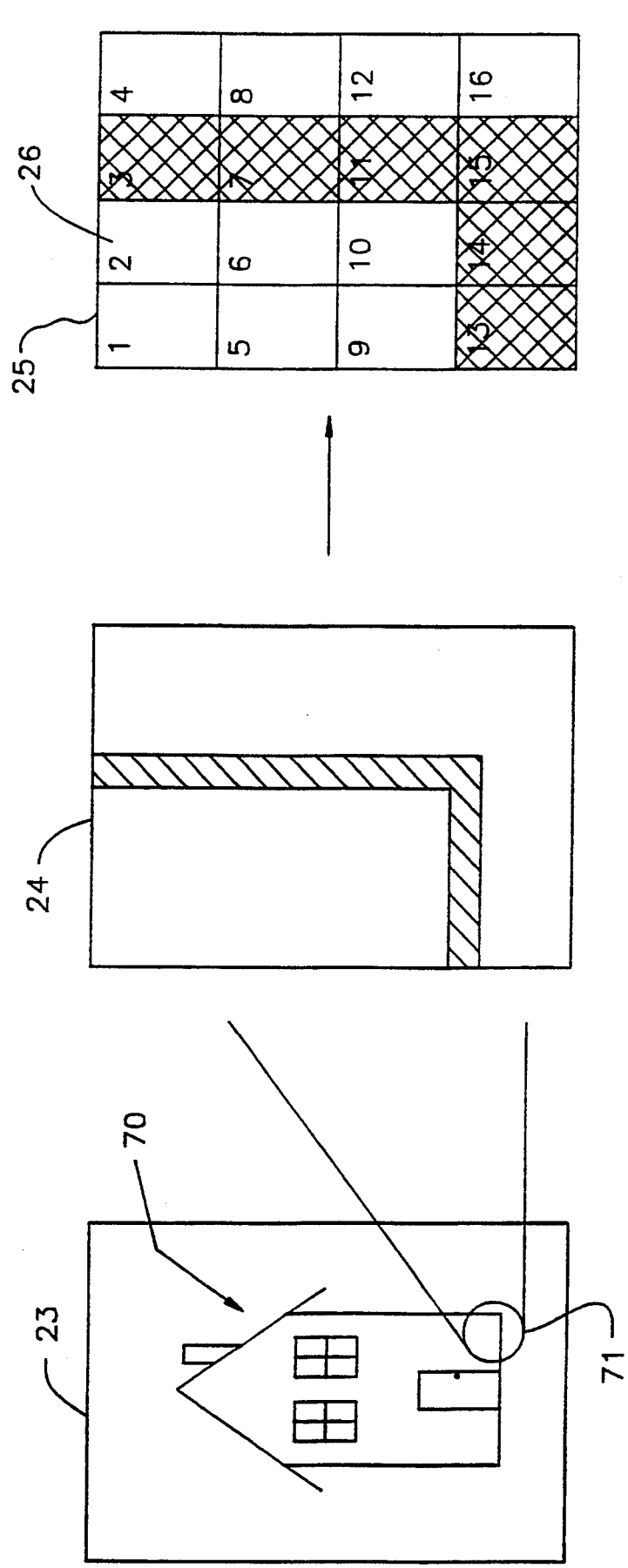
FIG. 6 is an example of the scanning of a document.

An example of the scanning of a document is shown in FIG. 6. For clarity, a portion 71 of the original document 23 is enlarged at 24. The corresponding scanned light and dark pixels are shown at 25, each dark pixel being represented in this example as a "1" in the generated bit pattern, and each light pixel being represented as "0." The bit addresses shown at 26 are limited to the sample area for the purposes of this explanation; the generalization to an entire scanned document will be evident from the example. The generated bit pattern is the "picture bitmap" in Table II below.

A password is used to encrypt the scanned bitmap. The binary representation of this password as, for example, an ASCII code may be used as the seed to a repeatable pseudo-random bit generator such as that shown on pages 29-31 of "Seminumerical Algorithms," second edition, which is volume 2 of "The Art of Computer Programming" by Donald E. Knuth, published by AddisonWesley Publishing Company of Reading, Mass. Table II represents the encryption of the picture bitmap in FIG. 6 using a pseudo-random repeatable bit stream:

TABLE II

| | |
|---|---|
| Bit address | 1 1 1 1 1 1 1<br>1 2 3 4 5 6 7 8 9 0 1 2 3 4 5 6 |
| Random Bits | 1 0 1 1 0 0 1 0 0 1 1 1 0 1 1 0 |
| Picture bitmap | 0 0 1 0 0 0 1 0 0 0 1 0 1 1 1 0 |
| Encrypted (XORed) bitmap | 1 0 0 1 0 0 0 0 0 1 0 1 1 0 0 0 |

Figure 8:
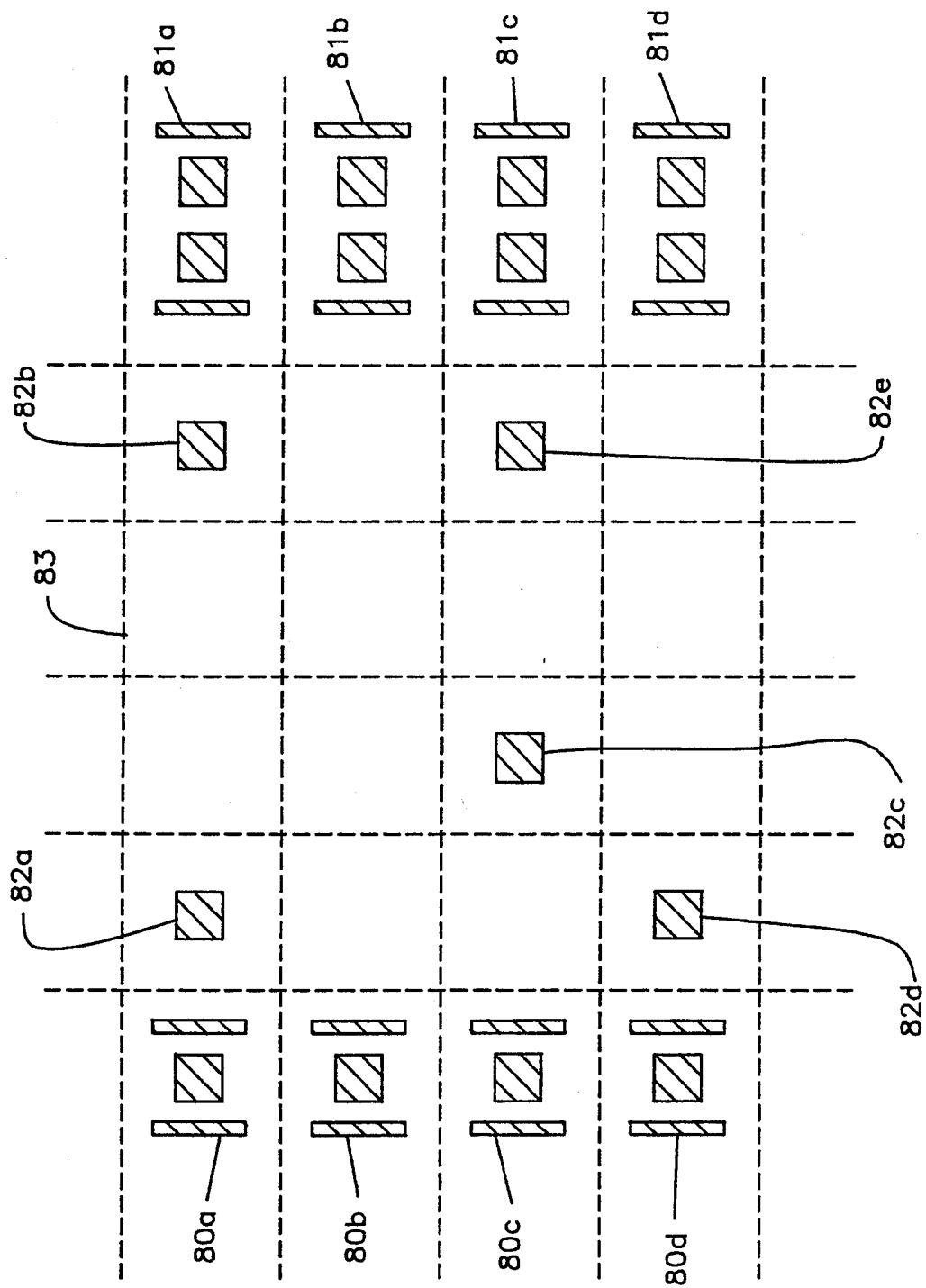
FIG. 8 is an example of a printed encrypted image (PEI).
Figure 9:
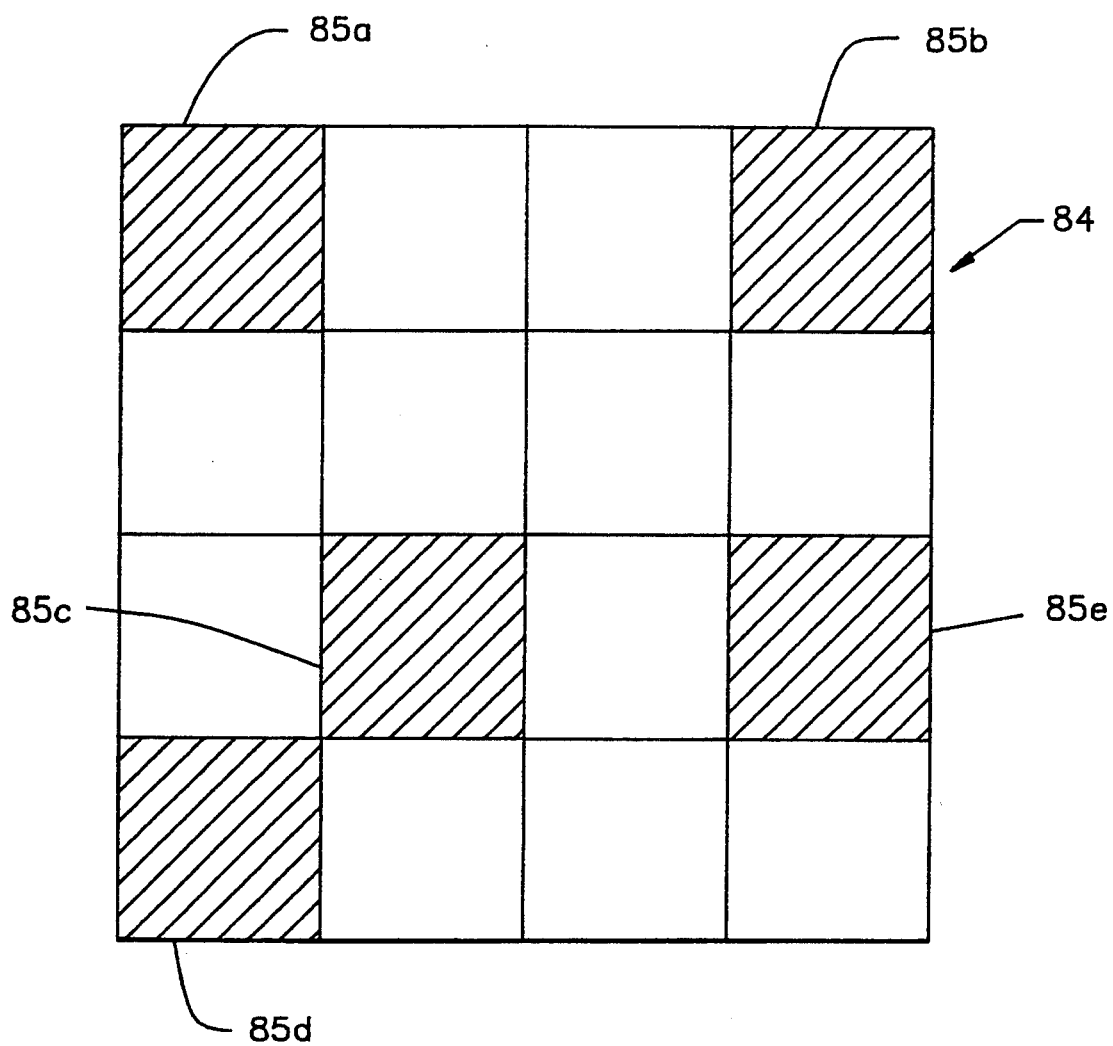
FIG. 9 is an example of the reading of the encrypted image symbols into a grid.

The printed encrypted image (PEI) corresponding to this example is illustrated in FIG. 8. As explained more fully below, a symbol alphabet consisting of very simple shapes is used to print the PEI. Alignment markers including beginning-of-line markers 80a, 80b, 80c, and 80d and end-of-line markers 81a, 81b, 81c, and 81d are included. (These markers are shown to enclose only the encrypted portion 71 of the document 23, an obvious simplification made for this example because of the large size of both the encrypted and unencrypted bitmaps. Each page of encrypted output would also have a top-of-page and bottom-of-page marker, not shown in this example.) The various delimiting markers serve to delimit the space in which encrypted symbols appear. Spurious marks, including holes left by staples, appearing outside of these delimiters, are ignored during decryption. Symbols 82a, 82b, 82c, 82d, and 82e, representing the five "1" bits of the encrypted bitmap, are shown placed in an implied grid 83. (The implied grid, delimited by dashed lines 83, is not actually printed on the PEI.) The PEI may then be faxed, copied, and delivered to the recipient. The PEI is scanned, and, using the alignment markers, the symbols representing the encrypted bitmap are recognized and placed into a corresponding array 84 in FIG. 9. (Darkened blocks 85a, 85b, 85c, 85d, and 85e are the grid elements corresponding to symbols 82a, 82b, 82c, 82d, and 82e, respectively.) The array is then read sequentially and decrypted by the same sequence used to encrypt the original pixels, the sequence being generated by a random bit generator seeded by the password. This decryption is shown in Table III. The decrypted pixels are then placed on the page in a proper grid, which generates the original document 23, or in this example, the portion 71 of the document 23, since it will be seen that the decrypted pixels in Table III are identical in value and sequence to those of portion 71. Of course, an adjustment in positioning the pixels will be required for decrypting an entire picture, inasmuch as in the preferred case, there will be fewer symbols representing the encrypted bits than there are pixels in the original picture, unlike this simple example.

TABLE III

| | |
|---|---|
| Bit address | 1 1 1 1 1 1 1<br>1 2 3 4 5 6 7 8 9 0 1 2 3 4 5 6 |
| Encrypted (XORed) bitmap | 1 0 0 1 0 0 0 0 0 1 0 1 1 0 0 0 |
| Random Bits | 1 0 1 1 0 0 1 0 0 1 1 1 0 1 1 0 |
| Decrypted Picture bitmap | 0 0 1 0 0 0 1 0 0 0 1 0 1 1 1 0 |

Of course, other encryption algorithms can be used. With public key systems of the sort mentioned above, it is not even required that the passwords used to decrypt and encrypt the document be the same.

The example described above does not include compression (step 102 of FIG. 10), which is preferably applied to a scanned bitmap prior to encryption. Standard compression algorithms operating on a contiguous stream of bits could be used. For example, a fixed length data block preceded by a code indicating "uncompressed" could be used to represent uncompressed data. If the code for "uncompressed" is 01 and the fixed length data block is 32 bits long, a data block with prefix for a particular portion of a scanned bitmap might look like this:

| (un)compression code | bitmap data |
|---|---|
| 01 | 00000000000000001001001011000101 |

If a fixed-maximum length compression code is applied, representing between 16 and 496 consecutive zeros or ones (for example), the above data block could be compressed. Assuming that the compression code is 10 followed by a 0 or a 1 (indicating that the code represents consecutive zeros or ones, respectively) followed by the length of the consecutive string of zeros or ones, up to a maximum of 496, with the length divided by 16, the first 16 bits of the uncompressed bitmap could be represented as follows:

| compression code | repeated bit | repeat count (in binary) divided by 16 |
|---|---|---|
| 10 | 0 | 00001 |

Obviously, the greater the number of consecutive zeros or ones, the greater the compression of the bitmap. In this example, it is clear that repeat counts greater than 496 can be represented simply by additional blocks of compressed or uncompressed data, as required.

Figure 7:
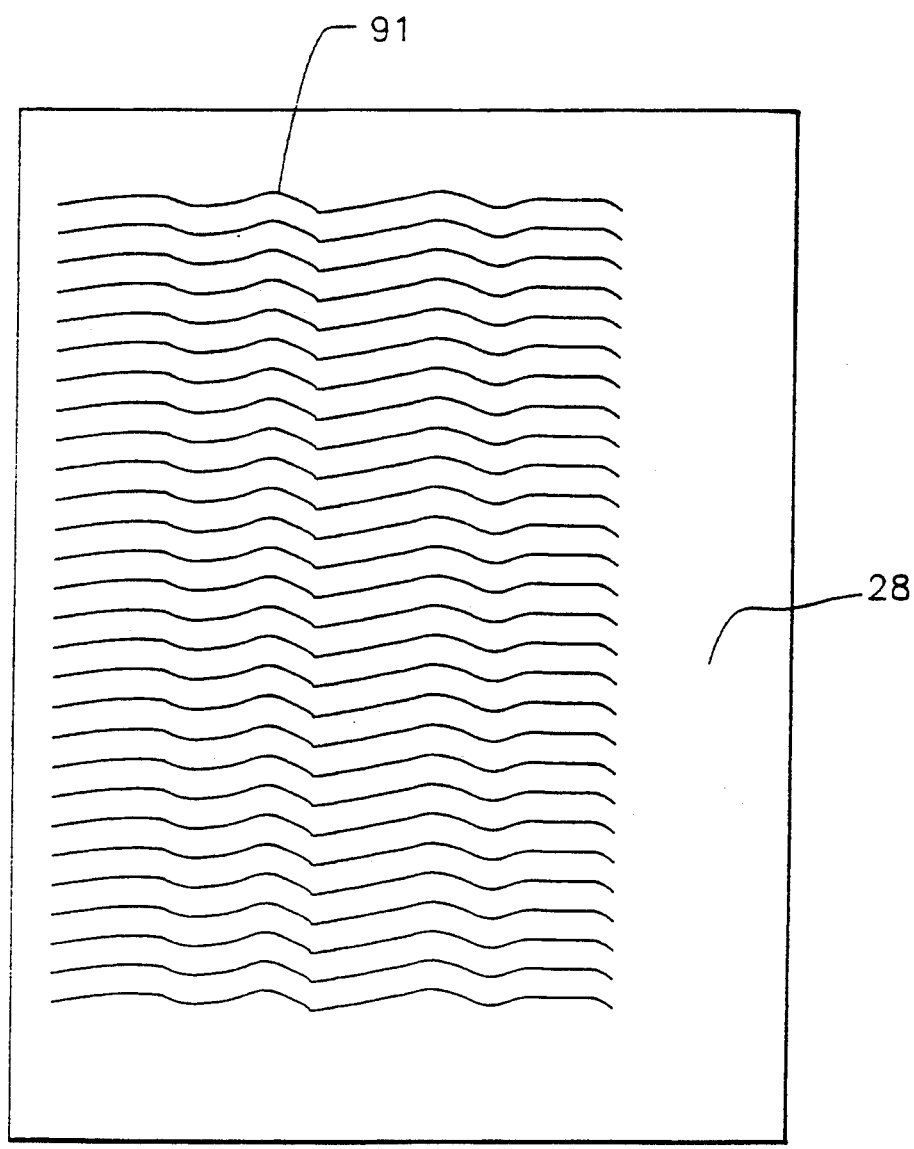
FIG. 7 is a schematic example of a page for which polygonal compression of the scanned bitmap is appropriate.

Polygonal compression can also be used. FIG. 7 shows an example in which there is only a small opportunity for continuous bit compression, but a big opportunity for compression using polygonal compression. Wavy lines 91 represent text or handwriting, with a substantial white area left at 28. All white area 28 provides the opportunity for polygonal compression. For this method to work, the whole page is scanned into RAM. Then, polygonal areas of all white or black, for example, are recognized and a code is generated stating where on the page the polygon is to be placed. The code would state the X,Y coordinates of each vertex of the polygon. Polygon codes would be transmitted at the beginning of each page image. The uncompressed or sequentially linearly compressed data would be coded to fill in around the polygons.

After the processor scans the original page and determines the content of the encrypted bitmap, the output page is printed. To ensure a reliable and efficient recognition and decoding of an encrypted document sent by facsimile transmission, and allowing for the ever-present line noise encountered over voice grade telephone lines, it is desirable to print (or skip) four pixel positions for each pixel in the original scan line. This means that a binary one is printed as four dots on the encrypted version of the document. In addition, two dots are preferably used as a space between each of the dots, and two lines are used between each scan line. In accordance with this scheme, the encrypted sequence 101 is printed as a two-by-two square (the first 1), followed by a two-by-two space, followed by another two-by-two space (the 0), followed by a two-by-two space, followed by a two-by-two square (the second 1). At the end of each printed line, two lines are skipped. To allow the original scan lines to be decrypted (step 110 of FIG. 10), the end of each original scan line is preferably marked by a double dash (--) in the printout. The expansion and grouping of pixels described here together with the compression described above means that the end of each original scan line could occur anywhere on a printed output line. It is also preferable that the beginning and ending of each line of encoded printout be marked by vertical bars, that contiguous polygon codes be printed twice, with checksum information, and that additional coding mark the top and bottom of each page and the start and finish of the document. Although this format is believed preferable for the printed encrypted output, other formats are also possible. One particularly simple modification would be to make the size of the printed squares larger for facsimile transmission if required to combat telephone line noise.

The encrypted document is preferably a deliberately "widely spaced" document. Even with this arrangement of the pixels, however, some may be lost during scanning and decryption due to printing and scanning anomalies in the fax machine and line noise. Since the result is a printed bitmap of the original document, however, some data loss is tolerable and will not result in noticeable loss of user information. Because of the preferred wide spacing, encrypted documents will often be larger than the original. If there is a lot of contiguous white or black space in the original, however, the simple compression method described above will reduce the size of the encrypted output.

Decryption of the document is essentially one of character recognition. Because of the preferred method of printing the encrypted output, the problem of decryption is essentially one of pattern recognition of a limited alphabet of geometric shapes, i.e., vertical and horizontal lines, dots (or squares), and spaces. As each scan line is read (step 108 of FIG. 10), the decryption engine determines, from the spaces between the " | " characters, the relative spacing of the characters on the page. To provide orientation, a "start of page code" may be provided. The preferred code is an entire line of dashes, i.e., "-", with orientation bars, i.e., " | ", at either end.

Decryption of the document is dependent upon entering the correct seed. If the bitmap (108b of FIG. 10) is xor-ed with the random number generator, entering an incorrect seed will generate a random pattern of black and white pixels.

As multiple scan lines are processed, a compressed bitmap (110b of FIG. 10) for each output page is built up by the microcomputer's memory. As each page is completed, it is decompressed (step 112 of FIG. 10) and a reproduction of the original, unencrypted document is printed. A buffer large enough to store two pages is preferred, with one buffer being used to store a scanned image and the other buffer being used to store the page to be printed (114 of FIG. 10).

It is possible to add the invention to facsimile systems that are built into or added to personal computers (PCs). Documents can be created within PC applications. These items are then processed by a facsimile processing system including software and hardware imbedded in the PC. Using this embodiment, a personal computer, with its keyboard and display, would replace processor 7, keyboard 12, and display 11 in FIG. 2. The personal computer's scanner and printer would perform the functions of scanner 6 and printer 13, respectively. On the receiving end, the received document would be read by a companion software program in the receiving PC. The decrypted document could then be viewed by the same PC facsimile software that views standard incoming facsimiles. In addition, the invention can be imbedded in standard facsimile machines. It would then be possible to send an encrypted version of the document directly from one machine to another, bypassing the step of printing the encrypted version of the document. At the receiving end, either the encoded document can be printed or a message can be displayed, requesting the recipient to come to the facsimile machine and enter the document password, so that the document can be printed.

Of course, other modifications can be made without departing from the spirit of the invention. For example, the display unit 11 is not limited to an LCD display; a CRT (cathode display tube) display could be used, for example. The keyboard 12 may be of any of various types, preferably small enough to be integral with the unit, although a detachable keyboard could be used. Any of the various technologies currently used for keyboards such as those found on pocket calculators would be suitable, for example.

Further, it is possible to completely computerize the system. In such a system, in which a document is created in a computer (e.g., by a word processor), it may never be printed, but instead could be encrypted in the computer, sent as an image (e.g., by the computer's built-in fax) to another computer, decoded, and displayed on a CRT or other suitable display. Another possibility is to output the encrypted image to a diskette or ROM card and then insert it into a decrypter to view it without printing it.

It is also possible to provide processor 7 with multiple encryption and/or decryption algorithms, e.g., different pseudo-random sequence generators that generate different repeatable patterns from the same seed, to generate different levels of security, for example. These could be selected by the user by entering an appropriate response on keyboard 12 to a prompt on display 11. Information as to which encryption algorithm has been used to encrypt a document could be displayed as part of the automatically produced unencrypted text 61, or it could be encoded in any of several places in the encrypted portion of the document, such as by varying the top-of-page code 63, or by embedding an algorithm identifier within the coded symbols 62.

These and other modifications consistent within the scope and spirit of the invention will suggest themselves to those skilled in the art.

What is claimed is:

1. A system for encrypting and decrypting a document, the system comprising:
   a first optical scanner for scanning the document to produce a first bitmap;
   a first processor for encrypting the first bitmap representative of the document into an encrypted bitmap;
   a first character entry device coupled to the first processor for input of non-encrypted character information;
   a modem coupled to the first processor for transmitting the encrypted bitmap and the non-encrypted character information over a communications link;
   a second processor, having a memory, coupled to the communications link for storing the encrypted bitmap and the non-encrypted character information received over the communications link in memory and separating the information and the encrypted bitmap, and thereafter decrypting the encrypted bitmap into a decrypted bitmap, the decrypted bitmap being a replica of the first bitmap representative of the document; and
   an output device coupled to the second processor to output the non-encrypted character data and the decrypted bitmap.

2. The system of claim 1 wherein the encrypted bitmap comprises multi-pixel symbols.

3. A system for encrypting and decrypting a document, the system comprising:
   a first memory for storing the document as a first bitmap;
   a first processor coupled to the first memory for encrypting the first bitmap representative of the document stored in the first memory into an encrypted bitmap;
   a first character entry device coupled to the first processor for input of non-encrypted character information;
   a modem coupled to the first processor for transmitting the encrypted bitmap and the non-encrypted character information over a communications link;
   a second processor, having a second memory, coupled to the communications link for storing the encrypted bitmap and the non-encrypted character information received over the communications link in the second memory and separating the information stored in the second memory into the non-encrypted character information and the encrypted bitmap, and thereafter decrypting the encrypted bitmap into a decrypted bitmap, the decrypted bitmap being a replica of the first bitmap representative of the document; and
   an output device coupled to the second processor to output the non-encrypted character data and the decrypted bitmap.

4. The system of claim 3 wherein the encrypted bitmap comprises multi-pixel symbols.

5. A system for encrypting and decrypting a document, the system comprising:
   a first processor for encrypting a first bitmap representative of the document into a first encrypted bitmap;
   a data entry device coupled to the first processor for input of non-encrypted character information;
   means, coupled to the first processor and the data entry device, for transmitting a combination of the first encrypted bitmap and the non-encrypted character information over a communications link; and
   a second processor coupled to the communications link for separating the combination into the non-encrypted character information and a second encrypted bitmap, and thereafter decrypting the second encrypted bitmap into a decrypted bitmap, the decrypted bitmap being a replica of the first bitmap representative of the document.

6. The system of claim 5 wherein the document includes both pictorial and non-pictorial data.

7. The system of claim 5 wherein the data entry device is a keyboard.

8. The system of claim 5 wherein the data entry device accepts as input an encryption key, wherein the encryption of the first bitmap into the first encrypted bitmap is in accordance with the encryption key.

9. The system of claim 8 further comprising a second data entry device coupled to the second processor for entry of a decryption key, wherein the decryption of the second encrypted bitmap is in accordance with the decryption key.

10. The system of claim 5 wherein the first encrypted bitmap comprises multi-pixel symbols.

11. A system for encrypting and decrypting a document, the system comprising:
   a first processor for encrypting a bitmap representative of the document into an encrypted bitmap;
   means, coupled to the first processor, for transmitting the encrypted bitmap over a communications link;
   means for receiving the encrypted bitmap over the communications link;
   means, coupled to the communications link, for printing the encrypted bitmap;
   an optical scanner for scanner for scanning the encrypted bitmap after transmission of the encrypted bitmap over the communications link;
   a second processor coupled to the optical scanner for decrypting the encrypted bitmap into a decrypted bitmap, the decrypted bitmap being a replica of the bitmap representative of the document.

12. The system of claim 11 wherein the means for receiving the encrypted bitmap over the communications link and the means for printing the encrypted bitmap comprises a facsimile machine.

13. The system of claim 11 wherein the encrypted bitmap comprises multi-pixel symbols.

14. The system of claim 11 wherein the first processor includes a personal computer having a modem.

15. The system of claim 11 wherein the second processor includes a personal computer.

16. The system of claim 11 further comprising an optical scanner electrically coupled to the first processor for converting the document into the bitmap.

17. The system of claim 11 wherein the first processor includes an optical scanner for converting the document into the bitmap.

18. The system of claim 11 further comprising
   a first data entry device electrically coupled to the first processor for entry of an encryption key, wherein the encryption of the bitmap into the encrypted bitmap is in accordance with the encryption key; and
   a second data entry device electrically coupled to the second processor for entry of a decryption key, wherein the decryption of the encrypted bitmap is in accordance with the decryption key.

19. The system of claim 11, wherein the encrypted bitmap consists of symbols selected from the group consisting of: vertical lines, horizontal lines, dots, squares, and spaces.

20. The system of claim 11, wherein the first processor compresses the bitmap prior to encryption and wherein the second processor decompresses the decrypted bitmap subsequent to decryption.

21. The system of claim 20 wherein the compression of the bitmap comprises run-length encoding.

22. The system of claim 20, wherein the compression of the bitmap comprises polygonal encoding.

23. A method for the secure transfer of a document comprising textual and non-textual information, the method comprising the steps of:
   optically scanning the document to produce a first bitmap representative of the document;
   encrypting the first bitmap using an encryption key to create a second bitmap comprising multi-pixel symbols;
   transmitting the second bitmap over a communications link; and
   decrypting the second bitmap using a decryption key to create a third bitmap.

24. The of claim 23, further comprising the step of printing a representation of the third bitmap to produce a replica of document.

25. The method of claim 23, further comprising the step of displaying on a display device a representation of the third bitmap to produce a replica of the document.

26. The method of claim 23, further comprising the step of storing a representation of the third bitmap.

27. A method for encrypted electronic data transmission of a document comprising the steps of:
   creating an electronic encrypted pixel representation of the document;
   coding the pixels in the electronic encrypted pixel representation of the document into multi-pixel symbols;
   introducing markers at pre-defined locations within the electronic encrypted pixel representation of the document; and
   transmitting the electronic encrypted pixel representation of the document over a transmission line.

28. The method of claim 27, further comprising the step of compressing the electronic encrypted pixel representation of the document prior to transmission.

29. The method of claim 27, wherein the electronic encrypted pixel representation is a fax-type bitmap.

30. The method of claim 27, wherein only a portion of the document is encrypted.

31. The method of claim 27, wherein the encrypted pixel representation comprises a plurality of lines and each line begins with a marker.

32. The method of claim 31, wherein the encrypted pixel representation comprises a plurality of lines and each line ends with a marker.

33. The method of claim 32, wherein a marker is introduced at the beginning of each page.

34. The method of claim 27, wherein a marker is introduced at the end of each page.

35. The method of claim 33, wherein the encrypted pixel representation comprises a plurality of lines and each line ends with a marker.

36. The method of claim 27, wherein the coding is performed in a computer.

37. The method of claim 27, further comprising the step of embedding an algorithm identifier in the multi-pixel symbols.

38. The method of claim 27, wherein the encrypted pixel representation comprises a plurality of scan lines and a plurality of dots.

39. A method for the transmission of data comprising the steps of:
   creating a digital representation of a document, the document including both text and non-text data;
   coding the digital representation of the document into multi-pixel symbols; and transmitting the multi-pixel symbols over a communications link.

40. The method of claim 39 wherein the communications link is a telephone line.

41. The method of claim 39 further comprising the steps of:

receiving the multi-pixel symbols over the communications link; and printing the multi-pixel symbols.

* * * * *